(12) United States Patent
Schriever et al.

(10) Patent No.: US 11,400,530 B2
(45) Date of Patent: Aug. 2, 2022

(54) CHAINSAW AND METHOD

(71) Applicant: HUSQVARNA AB, Huskvarna (SE)

(72) Inventors: Robert Walter Schriever, Concord, NC (US); E. Arnold Fie, II, Denver, NC (US); Garrett Sherman, Huntersville, NC (US); Victor Stramenga, Mooresville, NC (US)

(73) Assignee: HUSQVARNA AB, Huskvarna (SE)

( * ) Notice: Subject to any disclaimer, the term of this patent is extended or adjusted under 35 U.S.C. 154(b) by 120 days.

(21) Appl. No.: 16/620,752

(22) PCT Filed: Jun. 7, 2018

(86) PCT No.: PCT/IB2018/054125
§ 371 (c)(1),
(2) Date: Dec. 9, 2019

(87) PCT Pub. No.: WO2018/225011
PCT Pub. Date: Dec. 13, 2018

(65) Prior Publication Data
US 2020/0198031 A1   Jun. 25, 2020

Related U.S. Application Data

(60) Provisional application No. 62/517,503, filed on Jun. 9, 2017.

(51) Int. Cl.
*B23D 59/00* (2006.01)
*B27B 17/02* (2006.01)
*B27B 17/14* (2006.01)

(52) U.S. Cl.
CPC ............ *B23D 59/001* (2013.01); *B27B 17/02* (2013.01); *B27B 17/14* (2013.01)

(58) Field of Classification Search
CPC ....... B27B 17/02; B27B 17/14; B27B 17/025; B27B 17/04; B23D 59/001
See application file for complete search history.

(56) References Cited

U.S. PATENT DOCUMENTS 8,636,140 B2    1/2014  Tout et al.
2013/0020102 A1* 1/2013  Bjornlinger ............... B25F 5/00
                                                  173/2
2020/0198031 A1* 6/2020  Schriever ............. B23D 59/001

FOREIGN PATENT DOCUMENTS

CA            2923446 A1    3/2015
DE         20319743 U1 *    3/2005  ............. B27B 17/14
                (Continued)

OTHER PUBLICATIONS

DE20319743-U1 English Translation; Mar. 2005 Dolmar.*
(Continued)

*Primary Examiner* — Laura M Lee
(74) *Attorney, Agent, or Firm* — Burr & Forman LLP

(57) ABSTRACT

Herein a chainsaw (1) is disclosed comprising a guide bar (3) and a chain (5) moveably arranged around the guide bar (3). The chainsaw (1) comprises an motor (9) comprising a motor shaft (11), wherein the motor (9) is configured to drive the chain (5) via the motor shaft (11). The chainsaw (1) further comprises a tension estimation arrangement (13) configured to sense a load on the motor shaft (11), and configured to estimate the tension of the chain (5) around the guide bar (3) on the basis of the sensed load on the motor shaft (11). The present disclosure further relates to a method of estimating tension of a chain (5) of a chainsaw (1).

20 Claims, 2 Drawing Sheets

(56) References Cited

FOREIGN PATENT DOCUMENTS

| | | | | |
|---|---|---|---|---|
| DE | 20319743 U1 | 3/2005 | | |
| EP | 2445687 B1 | 4/2013 | | |
| WO | WO-2010149338 A1 * | 12/2010 | ............ | B27B 17/14 |
| WO | 2011/100988 A1 | 8/2011 | | |
| WO | 2016/139577 A1 | 9/2016 | | |
| WO | WO-2019222249 A2 * | 11/2019 | ........... | B23D 59/001 |

OTHER PUBLICATIONS

International Search Report and Written Opinion for International Application No. PCT/IB2018/054125 dated Sep. 12, 2018.

* cited by examiner

# CHAINSAW AND METHOD

CROSS REFERENCE TO RELATED APPLICATION

This application claims priority to U.S. application No. 62/517,503 filed Jun. 9, 2017, the entire contents of which are hereby incorporated by reference in its entirety.

TECHNICAL FIELD

The present invention relates to chainsaw comprising a tension estimation arrangement. The present invention further relates to a method of estimating tension of a chain of a chainsaw.

BACKGROUND

A chainsaw is mechanical saw which cuts with a number of cutting members, such as teeth, attached to a rotating chain that runs along a guide bar. A motor, such as a combustion engine or an electric motor, is arranged to rotate the chain around the guide bar, usually via a motor shaft, a transmission and a drive sprocket arranged at a rear end portion of the guide bar. A chainsaw is used in activities such as tree felling, limbing, bucking, pruning, etc.

The tension of the chain around the guide bar is an important factor, especially regarding the safety of an operator, and also regarding durability of the chain and the chainsaw.

The tension of the chain changes throughout the use of the chainsaw. Usually, the chain stretches during normal operation, and if the chain is allowed to become too loose, it can easily come off the guide bar during operation and create an unsafe situation for the user. Conversely, tightening the chain too tightly risks breaking it during operation, which also creates an unsafe situation for the user. In addition, an improperly tensioned chain may increase wear of components of the chainsaw, such as the chain, the guide bar, the drive sprocket, and a bearing supporting the shaft of the drive sprocket.

Accordingly, for many reasons, the tension of the chain should be checked and tightened often. A common way to determine whether or not the tension of the chain needs to be adjusted is to pull the chain away from the guide bar a little to see how far the chain can be pulled from the guide bar. If the chain can be pulled a great distance from the guide bar, the chain needs to be tightened. If the chain cannot be pulled from the guide bar, or can be pulled only a short distance, the chain needs to be loosened. Usually, the instruction manual of a chainsaw comprises instructions which inform the user how to perform these manual steps to determine the tension of the chain, and then to use a tension adjustment arrangement, such as a tension adjustment screw, to adjust the tension of the chain.

Obviously, such a procedure for determining the tension of the chain is cumbersome and chances are that it is done incorrectly, for example if the instructions are misinterpreted. If the chain is incorrectly tensioned, one or more of the above above-mentioned consequences may occur, which, as explained above, may create an unsafe situation for the user.

In addition, generally, today's consumer market requires high quality products comprising different features and functions, which products can be manufactured in a cost-efficient manner.

SUMMARY

It is an object of the present invention to overcome, or at least alleviate, at least some of the above-mentioned problems and drawbacks.

According to a first aspect of the invention, the object is achieved by a chainsaw comprising a guide bar and a chain moveably arranged around the guide bar, wherein the chain comprises a number of cutting members. The chainsaw further comprises a motor comprising a motor shaft, wherein the motor is configured to drive the chain via the motor shaft. The chainsaw further comprises a tension estimation arrangement configured to sense a load on the motor shaft, and configured to estimate the tension of the chain around the guide bar on the basis of the sensed load on the motor shaft.

Thereby, a chainsaw is provided capable of estimating the tension of the chain around the guide bar in a simple, quick, and convenient manner. Since the tension estimation arrangement is configured to estimate the tension of the chain around the guide bar on the basis of the sensed load on the motor shaft, it may circumvent the need for performing a cumbersome manual procedure for determining the tension of the chain.

Further, since the tension of the chain around the guide bar is estimated in a simple, quick, and convenient manner, a safer chainsaw may be provided since the tension of the chain may be estimated without using the cumbersome manual procedure, and since the tension of the chain may be estimated more often than when using the manual procedure. As an example, the tension of the chain can be estimated, between two cutting procedures, without the user having to remove the hands from the handle grips of the chainsaw.

Thus, a chainsaw is provided overcoming, or at least alleviating, at least some of the above-mentioned problems and drawbacks. As a result, the above-mentioned object is achieved.

Optionally, the tension estimation arrangement is configured to sense the speed of the chain, and wherein the tension estimation arrangement is further configured to estimate the tension of the chain around the guide bar on the basis of the speed of the chain. Thereby, a more accurate estimation of the tension of the chain is performed.

Optionally, the tension estimation arrangement is configured to sense the load on the motor shaft by sensing the load on the motor. Thereby, the tension of the chain can be estimated in a simple, quick, convenient, and accurate manner without using any additional sensors assigned for the task. That is, the tension estimation arrangement may utilize already existing components of the chainsaw for estimating the tension of the chain. Accordingly, a chainsaw is provided capable of estimating the tension of the chain around the guide bar in a simple, quick, convenient, and accurate manner, while conditions are provided for manufacturing the chainsaw in a cost-efficient manner.

Optionally, the motor is an electric motor, and wherein tension estimation arrangement is configured to sense the load on the electric motor by sensing the electric current supplied to the electric motor. Thereby, the tension of the chain can be estimated in a simple, quick, and accurate manner.

Optionally, the motor is an electric motor, and wherein the tension estimation arrangement is configured to sense the load on the electric motor by sensing the electric voltage supplied to the electric motor. Thereby, the tension of the chain can be estimated in a simple and quick manner.

Further, according to some embodiments, the tension estimation arrangement is configured to sense the load on the electric motor by sensing the electric voltage, as well as the electric current, supplied to the electric motor. Thereby, the tension of the chain can be estimated in still more accurate manner since the electric voltage and the electric current together indicate the power outputted by the electric motor.

Optionally, the tension estimation arrangement comprises a first tension estimation mode, wherein the tension estimation arrangement is configured to, in the first tension estimation mode, drive the chain at a predetermined speed, and wherein the tension estimation arrangement is configured to sense the load on the motor shaft when the chain moves at the predetermined speed. Thereby, the tension of the chain is estimated in still more accurate manner, since the speed of the chain and the load on the motor shaft together provide a clear indication of the tension of the chain.

Optionally, the tension estimation arrangement comprises a second tension estimation mode, wherein the tension estimation arrangement is configured to, in the second tension estimation mode, control the motor to produce a predetermined amount of power, and sensing a resulting speed of the chain, and to estimate the tension of the chain around the guide bar on the basis of the resulting speed of the chain. Thereby, the tension of the chain is estimated in still more accurate manner, since the predetermined amount of power and the resulting speed of the chain together provide a clear indication of the tension of the chain.

Optionally, the motor is an electric motor, and wherein the tension estimation arrangement comprises a third tension estimation mode, wherein the tension estimation arrangement is configured to, in the third tension estimation mode, supply a predetermined amount of electric voltage to the electric motor, and sensing draw of electric current at a resulting speed of the chain, and to estimate the tension of the chain around the guide bar on the basis of the sensed draw of electric current at the resulting speed of the chain. Thereby, the tension of the chain is estimated in still more accurate manner, since the predetermined amount of electric voltage, the draw of electric current, and the resulting speed of the chain together provide a clear indication of the tension of the chain.

Optionally, the chainsaw further comprises an input unit providing selection of a tension estimation mode, wherein the tension estimation arrangement is configured to only enter the tension estimation mode upon selection of the tension estimation mode. Thereby, a safe chainsaw is provided since the tension estimation arrangement is configured to only enter the tension estimation mode upon selection of the tension estimation mode, and since it is ensured that a user is aware of the forthcoming estimation of the tension of the chain.

Optionally, the chainsaw further comprises a user interface configured to output a notification indicative of the estimated tension of the chain. Thereby, the user is informed about the estimated tension of the chain, and may perform measures in response thereto, such as tensioning or loosening the chain.

According to a first aspect of the invention, the object is achieved by a method of estimating tension of a chain of a chainsaw, wherein the chainsaw comprises a guide bar and a chain moveably arranged around the guide bar, wherein the chain comprises a number of cutting members, wherein the chainsaw further comprises an motor comprising a motor shaft, wherein the motor is configured to drive the chain via the motor shaft, and wherein the chainsaw further comprises a tension estimation arrangement, wherein the method comprises:

sensing load on the motor shaft, and
estimating the tension of the chain around the guide bar on the basis of the sensed load on the motor shaft.

Thereby, a method is provided capable of estimating the tension of the chain around the guide bar in a simple, quick, and convenient manner. Since, according to the method, the tension of the chain around the guide bar is estimated on the basis of the sensed load on the motor shaft, the method may circumvent the need for performing a cumbersome manual procedure for determining the tension of the chain.

Further, since the tension of the chain around the guide bar is estimated in a simple, quick, and convenient manner, a safe method is provided since it provides conditions for estimating the tension of the chain without using the cumbersome manual procedure, and since the tension of the chain may be estimated more often than when using the manual procedure. As an example, according to the method, the tension of the chain can be estimated, between to cutting procedures, without the user having to remove the hands from the handle grips of the chainsaw.

Thus, a method is provided overcoming, or at least alleviating, at least some of the above-mentioned problems and drawbacks. As a result, the above-mentioned object is achieved.

Optionally, the method comprises:
sensing the speed of the chain, and
estimating the tension of the chain around the guide bar on the basis of the sensed speed of the chain.

Thereby, a more accurate estimation of the tension of the chain is performed.

Optionally, the method comprises:
sensing the load on the motor shaft by sensing the load on the motor.

Thereby, the tension of the chain can be estimated in a simple, quick, convenient, and accurate manner without using any additional sensors assigned for the task. That is, already existing components of the chainsaw may be utilized in the method for estimating the tension of the chain. Accordingly, a method is provided capable of estimating the tension of the chain around the guide bar in a simple, quick, convenient, and accurate manner, while it provides conditions for manufacturing a chainsaw, utilizing the method, in a cost-efficient manner.

Optionally, the motor of the chainsaw is an electric motor, and wherein the method comprises:
sensing the load on the electric motor by sensing the electric current supplied to the electric motor.

Thereby, the tension of the chain can be estimated in a simple, quick, and accurate manner.

Optionally, the motor of the chainsaw is an electric motor, and wherein the method comprises:
sensing the load on the electric motor by sensing the electric voltage supplied to the electric motor.

Thereby, the tension of the chain can be estimated in a simple and quick manner. Further, according to some embodiments, the method comprises sensing the load on the electric motor by sensing the electric voltage, and by sensing the electric current, supplied to the electric motor. Thereby, the tension of the chain can be estimated in still more accurate manner since the electric voltage and the electric current together indicate the power outputted by the electric motor.

Optionally, the tension estimation arrangement comprises a first tension estimation mode, wherein the method further comprises, in the first tension estimation mode:

driving the chain at a predetermined speed, and
sensing the load on the motor shaft when the chain moves at the predetermined speed.

Thereby, the tension of the chain is estimated in still more accurate manner, since the speed of the chain and the load on the motor shaft together provide a clear indication of the tension of the chain.

Optionally, the tension estimation arrangement comprises a second tension estimation mode, wherein the method further comprises, in the second tension estimation mode:

controlling the motor to produce a predetermined amount of power,
sensing a resulting speed of the chain, and
estimating the tension of the chain around the guide bar on the basis of the sensed resulting speed of the chain.

Thereby, the tension of the chain is estimated in still more accurate manner, since the predetermined amount of power and the resulting speed of the chain together provide a clear indication of the tension of the chain.

Optionally, the motor of the chainsaw is an electric motor, and wherein the tension estimation arrangement comprises a third tension estimation mode, wherein the method further comprises, in the third tension estimation mode:

supplying a predetermined amount of electric voltage to the electric motor, and
sensing draw of electric current at a resulting speed of the chain, and
estimating the tension of the chain around the guide bar on the basis of the sensed draw of electric current at the resulting speed of the chain.

Thereby, the tension of the chain is estimated in still more accurate manner, since the predetermined amount of electric voltage, the draw of electric current, and the resulting speed of the chain together provide a clear indication of the tension of the chain.

Optionally, the chainsaw further comprises an input unit providing selection of a tension estimation mode, wherein the method comprises:

entering the tension estimation mode only upon selection of the tension estimation mode.

Thereby, a safe method is provided since the method comprises the step of only entering the tension estimation mode upon selection of the tension estimation mode, and since it is ensured that a user is aware of the forthcoming estimation of the tension of the chain.

Optionally, the chainsaw further comprises a user interface, wherein the method further comprises:

outputting a notification indicative of the estimated tension of the chain, using the user interface.

Thereby, the user is informed about the estimated tension of the chain, and may perform measures in response thereto, such as tensioning or loosening the chain.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
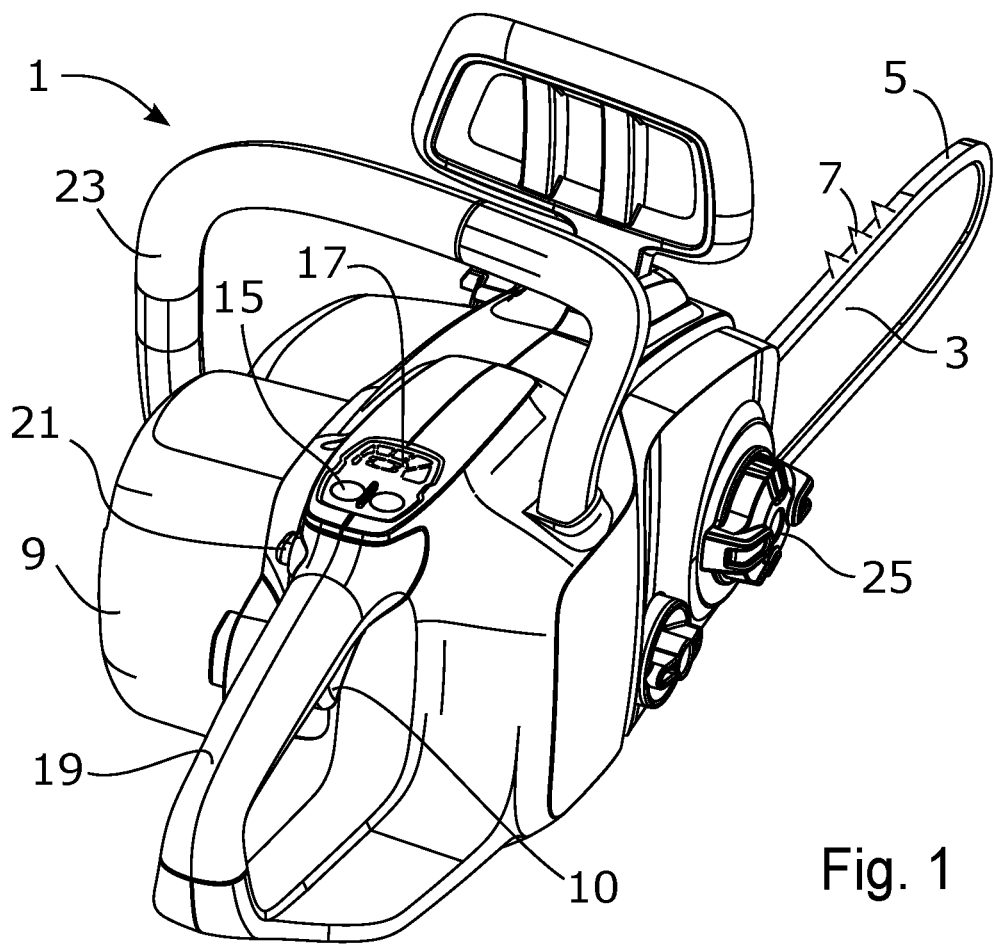
FIG. 1 illustrates a chainsaw, according to some embodiments.

FIG. 1 illustrates a chainsaw 1 according to some embodiments. The chainsaw 1 comprises a guide bar 3 and a chain 5 moveably arranged around the guide bar 3. The chain 5 comprises a number of cutting members 7 attached to the chain 5. The chainsaw 1 comprises a motor 9 and an actuator 10. The motor 9 is configured to drive the chain 5 upon control of the actuator 10. According to the illustrated embodiments, the motor 9 is an electric motor 9. The electric motor 9 may comprise a brushless direct-current motor. The chain saw 1 may comprise one or more batteries, or a power cord, arranged to supply electricity to the electric motor 9. According to further embodiments, the motor 9 may comprise a combustion engine, as is further discussed below.

Figure 2:
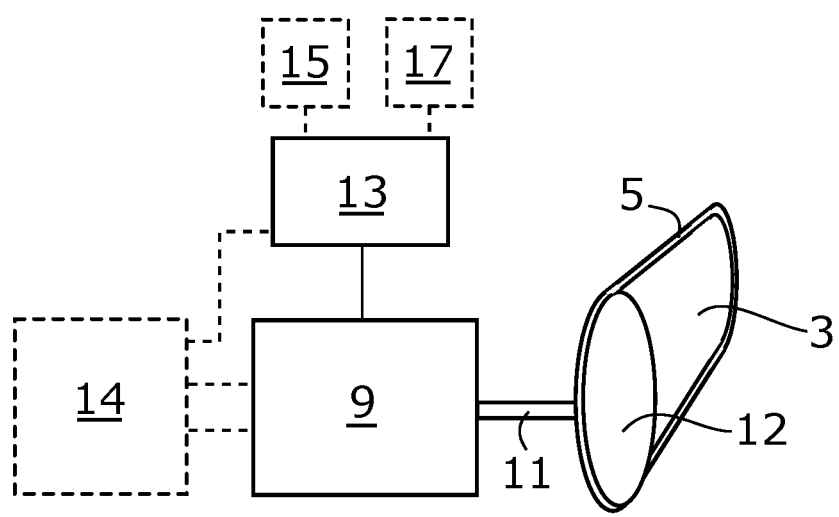
FIG. 2 schematically illustrates the motor, the guide bar, and the chain of the chainsaw, illustrated in FIG. 1.

FIG. 2 schematically illustrates the motor 9, the guide bar 3, and the chain 5 of the chainsaw 1, illustrated in FIG. 1. Below, reference is made to FIG. 2, as well as to FIG. 1. According to the illustrated embodiments, the chainsaw 1 comprises a motor shaft 11 and a drive sprocket 12. The motor 9 is configured to drive the chain 5 via the motor shaft 11 and the drive sprocket 12. According to further embodiments, the chainsaw 1 may comprise a transmission between the motor shaft 11 and the drive sprocket 12, which may provide a gear ratio therebetween.

The chainsaw 1 further comprises a tension estimation arrangement 13 configured to sense a load on the motor shaft 11, and configured to estimate the tension of the chain 5 around the guide bar 3 on the basis of the sensed load on the motor shaft 11. The tension of the chain 5 around the guide bar 3 affects the driving resistance of the chain 5 around the guide bar 3, which affects the load on the motor shaft 11. A loose chain 5 will provide a lower driving resistance, and thus also a lower load on the motor shaft 11, than an over tightened chain 5. Thus, the estimation of the tension of the chain 5, on the basis of the sensed load on the motor shaft 11, provides a simple, quick, convenient, and accurate estimation of the tension of the chain 5.

The sensing of the load on the motor shaft 11, and the estimation of the tension of the chain 5, may be performed during free revving conditions, i.e. when the motor 9 is driving the chain 5 in a condition where the chainsaw 1 not is used for cutting, e.g. between two cutting procedures, prior to a cutting procedure, or after a cutting procedure. According to further embodiments, the tension estimation arrangement 13 may comprise one or more tension estimation modes, wherein the tension estimation arrangement 13 is configured to sense the load on the motor shaft 11, and estimate of the tension of the chain 5, in the one or more tension estimation modes, as will be further explained below.

The tension estimation arrangement 13 may form part of an electronic control unit being configured to control operation of the motor 9 in dependence of the position of the actuator 10, as also is further described below.

According to the illustrated embodiments, the tension estimation arrangement 13 is configured to sense the load on the motor shaft 11 by sensing the load on the motor 9. According to the illustrated embodiments, the load on the electric motor 9 is sensed by sensing the electric current supplied to the electric motor 9. Thereby, the tension of the chain 5 is estimated in a simple and accurate manner. The electric current supplied to the electric motor 9 will be lower in cases of a loose chain than in cases of an over tightened chain. According to embodiments where the motor 9 comprises a combustion engine, the load on the motor shaft 11 may, for example, be sensed by sensing position of a throttle of the combustion engine, or by sensing consumption of fuel of the combustion engine.

According to some embodiments, the tension estimation arrangement 13 is configured to sense the speed of the chain 5. According to such embodiments, the tension estimation arrangement 13 may be configured to estimate the tension of the chain 5 around the guide bar 3 on the basis of the speed of the chain 5. The speed of the chain 5 may, for example, be sensed by detecting a rotational speed of the motor 9. The tension estimation arrangement 13 may be configured to estimate the tension of the chain 5 around the guide bar 3 on the basis of the electric current supplied to the electric motor 9 and of the speed of the chain 5. Thereby, an accurate estimation of the tension of the chain 5 is provided.

According to further embodiments, the tension estimation arrangement 13 may be configured to control the motor 9 to produce a predetermined amount of power, and to sense a resulting speed of the chain 5, and to estimate the tension of the chain 5 around the guide bar 3 on the basis of the resulting speed of the chain 5. The resulting speed of the chain 5 may be sensed a predetermined time, e.g. a couple of seconds, after the beginning of the output of the predetermined amount of power, or may be a stabilized resulting speed, e.g. a maximum speed obtained during the output of the predetermined amount of power. The electric motor 9 may be controlled to produce a predetermined amount of power by supplying a predetermined amount of electric current and a predetermined amount of electric voltage to the electric motor 9.

According to still further embodiments, the tension estimation arrangement 13 may be configured to sense the load on the motor shaft 11 by monitoring deceleration of the speed of the chain 5. That is, according to such embodiments, the tension estimation arrangement 13 may be configured to monitor the rate at which the chain 5 decelerates by monitoring the rate at which the motor 9 decelerates, for example when a user releases the actuator 10. Thereby, the tension of the chain 5 around the guide bar 3 can be estimated in a safe, simple, quick, convenient, and accurate manner. The motor 9 will be subjected to a slower deceleration in cases of a loose chain 5, than in cases of a tightened chain 5.

According to further embodiments, the tension estimation arrangement 13 is configured to sense the load on the electric motor 9 by sensing the electric voltage supplied to the electric motor 9. According to the illustrated embodiments, the chainsaw 1 comprises a battery 14 configured to supply electricity to the electric motor 9 and the tension estimation arrangement 13. According to some embodiments, the tension estimation arrangement 13 may monitor how the electric voltage of the battery 14 changes during a particular driving procedure of the chain 5. Thereby, the tension of the chain 5 can be estimated in a simple manner by sensing the electric voltage supplied to the electric motor 9, which indicates the electric voltage of the battery 14. The electric voltage of the battery 14 may be reduced by a greater amount in cases of an over tightened chain 5 than in cases of a loose chain 5.

According to still further embodiments, the tension estimation arrangement 13 may be configured to estimate the tension of the chain 5 around the guide bar 3 on the basis of the electric current and the electric voltage supplied to the electric motor 9, as well as the speed of the chain 5. Thereby, a still more accurate estimation of the tension of the chain 5 is provided. This since the electric current and electric voltage together indicate the power produced by the electric motor 9. By compensating for the speed of the chain 5, the resistance force of the chain 5, and thus also the tension of the chain 5, can be estimated in an accurate manner.

According to some embodiments, the tension estimation arrangement 13 comprises a first tension estimation mode, wherein the tension estimation arrangement 13 is configured to, in the first tension estimation mode, drive the chain 5 at a predetermined speed, and wherein the tension estimation arrangement 13 is configured to sense the load on the motor shaft 11 when the chain 5 moves at the predetermined speed. The load on the motor shaft 11 may, for example, be sensed by sensing the electric current supplied to the electric motor 9.

According to some embodiments, the tension estimation arrangement 13 comprises a second tension estimation mode, wherein the tension estimation arrangement 13 is configured to, in the second tension estimation mode, control the motor 9 to produce a predetermined amount of power, and sensing a resulting speed of the chain 5, and to estimate the tension of the chain 5 around the guide bar 3 on the basis of the resulting speed of the chain 5. The resulting speed of the chain may be a stabilized resulting speed. The electric motor 9 may be controlled to produce a predetermined amount of power by supplying a predetermined amount of electric current, and a predetermined amount of electric voltage, to the electric motor 9.

According to some embodiments, the tension estimation arrangement 13 comprises a third tension estimation mode, wherein the tension estimation arrangement 13 is configured to, in the third tension estimation mode, supply a predetermined amount of electric voltage to the electric motor 9, and sensing draw of electric current at a resulting speed of the chain 5, and to estimate the tension of the chain 5 around the guide bar 3 on the basis of the sensed draw of electric current at the resulting speed of the chain 5. The resulting speed of the chain may be a stabilized resulting speed.

According to the illustrated embodiments, the chainsaw 1 comprises an input unit 15 providing selection of a tension estimation mode. The input unit 15 may comprise one or more buttons, knobs, or the like, via which a user of the chainsaw 1 may select and enter a tension estimation mode. The tension estimation arrangement 13 may be configured to only enter a tension estimation mode upon selection of the tension estimation mode, such as one of the first, second and third tension estimation mode. Thereby, a user will be aware of when the tension estimation arrangement 13 performs the estimation of the chain 5 around the guide bar 3, which may improve safety.

According to the illustrated embodiments, the chainsaw 1 comprises a user interface 17 configured to output a notification indicative of the estimated tension of the chain 5. Thereby, the user is informed about the estimated tension of the chain 5 and may perform measures in response thereto, such as tensioning or loosening the chain 5. The user interface 17 may comprise one or more of a display, a light emitting unit, such as a lamp or diode, or a speaker configured to output the notification. The notification may comprise a number indicating the tension of the chain 5, or may comprise a scale, gradation, or the like indicating the tension of the chain 5.

According to some embodiments, the tension estimation arrangement 13 is configured to request a user to enter a tension estimation mode via the user interface 17. According to the embodiments illustrated in FIG. 1, the chainsaw 1 comprises a first handle 19 comprising the actuator 10 and a safety button 21. Both the actuator 10 and the safety button 21 needs to be pressed to operate the chainsaw 1, according to the illustrated embodiments. Further, the chainsaw 1 comprises a second handle 23.

The user may be instructed, for example in the instruction manual of the chainsaw 1, and/or via the user interface 17, to enter the tension estimation mode, using the input unit 15, and to grip the second handle 23 using one hand, and to grip the first handle 19 using the other hand, when an estimation of the tension of the chain 5 is to be performed. According to such embodiments, the tension estimation arrangement 13 may be configured to only enter the tension estimation mode, when a tension estimation mode is selected, and when the actuator 10 and the safety button 21 is pressed. Thereby, the tension estimation arrangement 13 can perform the estimation of the chain 5 around the guide bar 3 in a safe manner since it is ensured that the user is gripping at least the first handle 19, and since it is ensured that the user is aware of the estimation being performed.

The tension estimation arrangement 13 may be configured to estimate the tension of the chain 5 by comparing a sensed value and one or more stored values, such as threshold values. According to some embodiments, the tension estimation arrangement 13 may be configured to estimate the tension of the chain 5 by comparing a sensed value and a first threshold value. Such a sensed value may be one or more of the load on the motor shaft 11, the speed of the chain 5, the load on the motor 9, the electric current supplied to the electric motor 9, the electric voltage supplied to the electric motor 9, the power produced by the motor 9, the resulting speed of the chain 5, and the draw of electric current.

For example, if the sensed value, such as a sensed electric current, is below the first threshold value, the tension of the chain 5 may be determined to be too loose. The tension estimation arrangement 13 may in response thereto output a notification, via the user interface 17, indicating to a user that the chain 5 needs to be tightened. Further, the sensed value, such as the sensed electric current, may also be compared with a second threshold value, and if the sensed value exceeds the second value, the tension of the chain 5 may be determined to be too tightened. The tension estimation arrangement 13 may in response thereto output a notification, via the user interface 17, indicating to a user that the chain 5 needs to be loosened. In addition, according to such embodiments, if the sensed value is between the first and second threshold values, the chain may be determined to be correctly tightened. As a response, the tension estimation arrangement 13 may output a notification, via the user interface 17, indicating to a user that the chain 5 is correctly tightened.

According to further embodiments, the tension of the chain 5 may be determined by comparing a sensed value and three or more stored values, such as threshold values. According to still further embodiments, the tension of the chain 5 may be determined by comparing a sensed value and a range, such as a numerical range, wherein the tension of the chain is estimated on the basis of the position of the sensed value within the range.

The stored values, such as the first and second threshold values, as well as further threshold values and ranges, may be based on values obtained by testing a chainsaw 1 at different tensions of the chain 5 while measuring values representative of one or more of the load on the motor shaft 11, the speed of the chain 5, the load on the motor 9, the electric current supplied to the electric motor 9, the electric voltage supplied to the electric motor 9, the power produced by the motor 9, the resulting speed of the chain 5, and the draw of electric current. Thereby, reliable and accurate stored values can be used in the determining of the tension of the chain 5.

According to the illustrated embodiments, the chainsaw 1 comprises a tension adjustment arrangement 25 allowing adjustment of the tension of the chain 5 around the guide bar 3 by adjusting the longitudinal relative position between the guide bar 3 and the drive sprocket 12.

Figure 3:
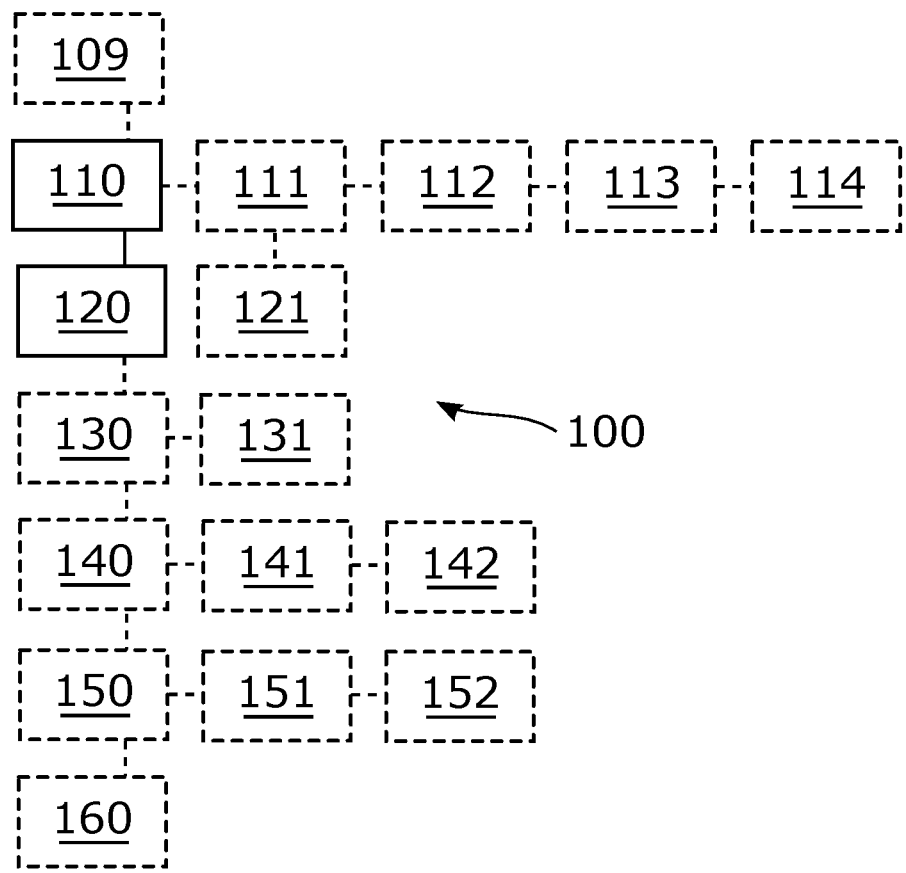
FIG. 3 illustrates a method of estimating tension of a chain of a chainsaw, according to some embodiments.

FIG. 3 illustrates a method 100 of estimating tension of a chain of a chainsaw, according to some embodiments. The chainsaw may be a chainsaw 1 as is illustrated in FIG. 1, which comprises the features illustrated in FIG. 2. Therefore, below, reference is made to FIG. 3, as well as to FIG. 1 and FIG. 2. The method 100 illustrated is a method 100 of estimating tension of a chain 5 of a chainsaw 1, wherein the chainsaw 1 comprises a guide bar 3 and a chain 5 moveably arranged around the guide bar 3, wherein the chain 5 comprises a number of cutting members 7, wherein the chainsaw 1 further comprises a motor 9 comprising a motor shaft 11, wherein the motor 9 is configured to drive the chain 5 via the motor shaft 11, and wherein the chainsaw 1 further comprises a tension estimation arrangement 13, wherein the method 100 comprises:

sensing 110 load on the motor shaft 11, and estimating 120 the tension of the chain 5 around the guide bar 3 on the basis of the sensed load on the motor shaft 11.

As illustrated in FIG. 3, the method 100 may comprise:

sensing 111 the speed of the chain 5, and estimating 121 the tension of the chain 5 around the guide bar 3 on the basis of the sensed speed of the chain 5.

As illustrated in FIG. 3, the method 100 may comprise:

sensing 112 the load on the motor shaft 11 by sensing the load on the motor 9.

According to some embodiments, the motor of the chainsaw is an electric motor, and as illustrated in FIG. 3, the method 100 may comprise:

sensing 113 the load on the electric motor 9 by sensing the electric current supplied to the electric motor 9.

According to some embodiments, the motor of the chainsaw is an electric motor, and as illustrated in FIG. 3, the method 100 may comprise:

sensing 114 the load on the electric motor 9 by sensing the electric voltage supplied to the electric motor 9.

According to some embodiments, the tension estimation arrangement 13 comprises a first tension estimation mode, and as illustrated in FIG. 3, the method 100 may further comprise, in the first tension estimation mode:

driving 130 the chain 5 at a predetermined speed, and sensing 131 the load on the motor shaft 11 when the chain 5 moves at the predetermined speed.

According to some embodiments, the tension estimation arrangement 13 comprises a second tension estimation mode, and as illustrated in FIG. 3, the method 100 may further comprise, in the second tension estimation mode:

controlling 140 the motor 9 to produce a predetermined amount of power, sensing 141 a resulting speed of the chain 5, and estimating 142 the tension of the chain 5 around the guide bar 3 on the basis of the sensed resulting speed of the chain 5.

According to some embodiments, the motor of the chainsaw is an electric motor, and wherein the tension estimation arrangement 13 comprises a third tension estimation mode, and as illustrated in FIG. 3, the method 100 may further comprise, in the third tension estimation mode:

supplying 150 a predetermined amount of electric voltage to the electric motor 9, and sensing 151 draw of electric current at a resulting speed of the chain 5, and estimating 152 the tension of the chain 5 around the guide bar 3 on the basis of the sensed draw of electric current at the resulting speed of the chain 5.

According to some embodiments, the chainsaw 1 further comprises an input unit 15 providing selection of a tension estimation mode, and as illustrated in FIG. 3, the method 100 may further comprise:

entering 109 the tension estimation mode only upon selection of the tension estimation mode.

According to some embodiments, the chainsaw 1 further comprises a user interface 17, and as illustrated in FIG. 3, the method 100 may further comprise:

outputting 160 a notification indicative of the estimated tension of the chain 5, using the user interface 17.

Figure 4:
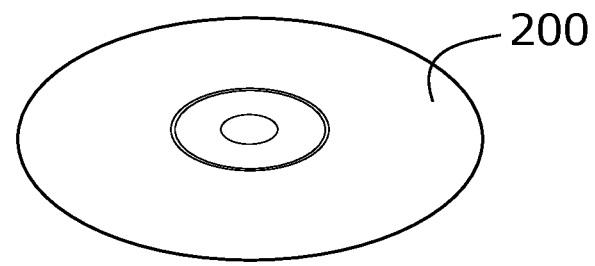
FIG. 4 illustrates a computer program product for performing a method of estimating tension of a chain of a chainsaw.

FIG. 4 illustrates a computer program product 200 for performing a method 100 of estimating tension of a chain of a chainsaw. The computer program product 200 comprises computer readable code. As mentioned above, the tension estimation arrangement 13 may form part of an electronic control unit. Therefore, below, the tension estimation arrangement 13 is referred to as the control unit 13.

Further, the computer program product 200 comprises a computer program for performing a method of estimating tension of a chain 5 of a chainsaw 1. The computer program comprises computer readable code, preferably embedded in the control unit 13, which may be configured to cause the control unit 13, as illustrated in FIG. 2, to perform the method 100 as illustrated in FIG. 3.

One skilled in the art will appreciate that the method of estimating tension of a chain 5 of a chainsaw 1 may be implemented by programmed instructions. These programmed instructions are typically constituted by a computer program, which, when it is executed by control unit 13, ensures that the control unit 13 carries out the desired control, such as the method steps 109, 110, 111, 112, 113, 114, 120, 121, 130, 131, 140, 141, 142, 150, 151, 152, 160 described herein. The computer program is usually an embedded part of the computer programme product 200, which comprises a suitable digital storage medium on which the computer program is stored.

The control unit 13 may comprise a calculation unit which may take the form of substantially any suitable type of processor circuit or microcomputer, e.g., a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression "calculation unit" may represent a processing circuitry comprising a plurality of processing circuits, such as, e.g., any, some or all of the ones mentioned above. The control unit 13 may further comprise a memory unit, wherein the calculation unit may be connected to the memory unit, which may provide the calculation unit with, for example, stored programme code and/or stored data which the calculation unit may need to enable it to do calculations. The calculation unit may also be adapted to store partial or final results of calculations in the memory unit. The memory unit may comprise a physical device utilised to store data or programs, i.e., sequences of instructions, on a temporary or permanent basis. According to some embodiments, the memory unit may comprise integrated circuits comprising silicon-based transistors. The memory unit may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The control unit 13 is connected to components of the chainsaw 1 for receiving and/or sending input and output signals. These input and output signals may comprise waveforms, pulses or other attributes which the input signal receiving devices can detect as information and which can be converted to signals processable by the control unit 13. These signals may then be supplied to the calculation unit. Each of the connections to the respective components of the chainsaw 1 for receiving and sending input and output signals may take the form of one or more from among a cable, a data bus, e.g. a CAN (controller area network) bus, a MOST (media orientated systems transport) bus or some other bus configuration, or a wireless connection.

In the embodiments illustrated, the chainsaw 1 comprises a control unit 13 but might alternatively be implemented wholly or partly in two or more control units that operate together or independently.

The computer program product 200 may be provided for instance in the form of a data carrier carrying computer program code for performing at least some of the steps according to some embodiments when being loaded into one or more calculation units of the control unit 13. The data carrier may be, e.g. a CD ROM disc, as is illustrated in FIG. 4, or a ROM (read-only memory), a PROM (programmable read-only memory), an EPROM (erasable PROM), a flash memory, an EEPROM (electrically erasable PROM), a hard disc, a memory stick, an optical storage device, a magnetic storage device or any other appropriate medium such as a disk or tape that may hold machine readable data in a non-transitory manner. The computer program product may furthermore be provided as computer program code on a server and may be downloaded to the control unit 13 remotely, e.g., over an Internet or an intranet connection, or via other wired or wireless communication systems.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A chainsaw comprising a guide bar, a chain moveably arranged around the guide bar, and an input unit operable by a user to select a tension estimation mode from among a plurality of selectable tension estimation modes that each measure tension in a corresponding different way, wherein the chain comprises a number of cutting members,
  wherein the chainsaw further comprises a motor comprising a motor shaft, wherein the motor is configured to drive the chain via the motor shaft, and
  wherein the chainsaw further comprises a tension estimation arrangement configured, in a first selectable tension estimation mode among the selectable tension estimation modes, to sense a load on the motor shaft, and estimate the tension of the chain around the guide bar based on the sensed load on the motor shaft.

2. The chainsaw according to claim 1, wherein the tension estimation arrangement is configured, in a second of the selectable tension estimation modes, to sense speed of the chain, and wherein the tension estimation arrangement is further configured to estimate the tension of the chain around the guide bar based on the speed of the chain.

3. The chainsaw according to claim 1, wherein the tension estimation arrangement is configured to sense the load on the motor shaft by sensing the load on the motor.

4. The chainsaw according to claim 3, wherein the motor is an electric motor, and wherein the tension estimation arrangement is configured to sense the load on the electric motor by sensing the electric current supplied to the electric motor.

5. The chainsaw according to claim 3, wherein the motor is an electric motor, and wherein the tension estimation arrangement is configured to sense the load on the electric motor by sensing the electric voltage supplied to the electric motor.

6. The chainsaw according to claim 1, wherein the tension estimation arrangement comprises a second tension estimation mode among the selectable tension estimation modes, wherein the tension estimation arrangement is configured to, in the second tension estimation mode, drive the chain at a predetermined speed, and wherein the tension estimation arrangement is configured to sense the load on the motor shaft when the chain moves at the predetermined speed.

7. The chainsaw according to claim 6, wherein the tension estimation arrangement comprises a third tension estimation mode among the selectable tension estimation modes, wherein the tension estimation arrangement is configured to, in the third tension estimation mode, control the motor to produce a predetermined amount of power, and sensing a resulting speed of the chain, and to estimate the tension of the chain around the guide bar based on the resulting speed of the chain.

8. The chainsaw according to claim 7, wherein the motor is an electric motor, and wherein the tension estimation arrangement comprises a fourth tension estimation mode among the selectable tension estimation modes, wherein the tension estimation arrangement is configured to, in the fourth tension estimation mode, supply a predetermined amount of electric voltage to the electric motor, and sensing draw of electric current at a resulting speed of the chain, and to estimate the tension of the chain around the guide bar based on the sensed draw of electric current at the resulting speed of the chain.

9. The chainsaw according to claim 1, wherein the tension estimation arrangement is configured to only enter the tension estimation mode upon selection of one of the selectable tension estimation modes.

10. The chainsaw according to claim 1, further comprising a user interface configured to output a notification indicative of the estimated tension of the chain.

11. A method of estimating tension of a chain of a chainsaw, wherein the chainsaw comprises a guide bar and a chain moveably arranged around the guide bar, wherein the chain comprises a number of cutting members, wherein the chainsaw further comprises a motor comprising a motor shaft, wherein the motor is configured to drive the chain via the motor shaft, wherein the chainsaw further comprises a tension estimation arrangement, and wherein the chainsaw further comprises an input unit operable by a user to select a tension estimation mode from among a plurality of selectable tension estimation modes that each measure tension in a corresponding different way, wherein the method comprises determining a first selected tension estimation mode from among the plurality of selectable tension estimation modes, and employing the first selected tension estimation mode by:
  sensing load on the motor shaft, and
  estimating the tension of the chain around the guide bar based on the sensed load on the motor shaft.

12. The method according to claim 11, wherein a second selected tension estimation mode from among the plurality of selectable tension estimation modes comprises:
  sensing speed of the chain, and
  estimating the tension of the chain around the guide bar based on the sensed speed of the chain.

13. The method according to claim 11, comprising:
  sensing the load on the motor shaft by sensing the load on the motor.

14. The method according to claim 13, wherein the motor of the chainsaw is an electric motor, and wherein the method comprises:
  sensing the load on the electric motor by sensing electric current supplied to the electric motor.

15. The method according to claim 13, wherein the motor of the chainsaw is an electric motor, and wherein the method comprises:
  sensing the load on the electric motor by sensing electric voltage supplied to the electric motor.

16. The method according to claim 11, wherein a second tension estimation mode from among the plurality of selectable tension estimation modes comprises:
  driving the chain at a predetermined speed, and
  sensing the load on the motor shaft when the chain moves at the predetermined speed.

17. The method according to claim 16, wherein a third tension estimation mode from among the plurality of selectable tension estimation modes comprises:
  controlling the motor to produce a predetermined amount of power,
  sensing a resulting speed of the chain, and
  estimating the tension of the chain around the guide bar based on the sensed resulting speed of the chain.

18. The method according to claim 17, wherein the motor of the chainsaw is an electric motor, and wherein a fourth tension estimation mode from among the plurality of selectable tension estimation modes comprises:
  supplying a predetermined amount of electric voltage to the electric motor, and
  sensing draw of electric current at a resulting speed of the chain, and
  estimating the tension of the chain around the guide bar based on the sensed draw of electric current at the resulting speed of the chain.

19. The method according to claim 11, wherein the method comprises:
  entering the tension estimation mode only upon selection of one of the plurality of selectable tension estimation modes.

20. The method according to claim 11, wherein the chainsaw further comprises a user interface, wherein the method further comprises:
  outputting a notification indicative of the estimated tension of the chain, using the user interface.

* * * * *